(12) United States Patent
Jouper et al.

(10) Patent No.: US 10,381,829 B2
(45) Date of Patent: Aug. 13, 2019

(54) DIRECT CURRENT POWER DISTRIBUTION AND FAULT PROTECTION

(71) Applicant: Astronics Advanced Electronic Systems Corp., Kirkland, WA (US)

(72) Inventors: Jeffrey A. Jouper, Newcastle, WA (US); John Fifield, Puyallup, WA (US)

(73) Assignee: Astronics Advanced Electronic Systems Corp., Kirkland, WA (US)

(*) Notice: Subject to any disclaimer, the term of this patent is extended or adjusted under 35 U.S.C. 154(b) by 84 days.

(21) Appl. No.: 15/472,518

(22) Filed: Mar. 29, 2017

(65) Prior Publication Data

US 2017/0207622 A1    Jul. 20, 2017

Related U.S. Application Data

(63) Continuation-in-part of application No. 14/514,617, filed on Oct. 15, 2014, now Pat. No. 10,340,679,
(Continued)

(51) Int. Cl.
*H02H 3/16* (2006.01)
*H02M 7/44* (2006.01)
(Continued)

(52) U.S. Cl.
CPC ............... *H02J 1/00* (2013.01); *H02H 3/10* (2013.01); *H02M 7/04* (2013.01); *H02J 4/00* (2013.01);
(Continued)

(58) Field of Classification Search
CPC .... H02J 1/00; H02J 4/00; H02M 7/04; H02M 1/4216; Y02B 70/126; Y10T 307/352; H02H 3/10
See application file for complete search history.

(56) References Cited

U.S. PATENT DOCUMENTS 3,500,056 A    3/1970    Riley
4,611,190 A    9/1986    Montague
(Continued)

FOREIGN PATENT DOCUMENTS

EP        2273645 A2    1/2011
WO    2011/081943 A2    7/2011

OTHER PUBLICATIONS

API Technologies Corp., EMI Power Filter Solutions, Jan. 2013.
(Continued)

*Primary Examiner* — Alfonso Perez Borroto
*Assistant Examiner* — Esayas G Yeshaw
(74) *Attorney, Agent, or Firm* — Wiggin and Dana LLP; Gregory S. Rosenblatt; Jonathan D. Hall

(57) ABSTRACT

A power distribution system including a high-voltage direct current unit (HVDCU) configured to receive an amount of high-frequency alternating current (AC) input power from a power source and convert the input power into DC power, a negative voltage distribution rail and a positive voltage distribution rail that are together configured to supply the high-voltage DC power to at least one control unit (CU) electrically disposed between the negative voltage distribution rail and the positive voltage distribution rail and the CU being configured to convert the DC power into output power compatible with at least one load and supply the output power to the loads associated with it.

17 Claims, 3 Drawing Sheets

Related U.S. Application Data which is a continuation-in-part of application No. 14/273,139, filed on May 8, 2014, now Pat. No. 10,164,545.

(51) Int. Cl.

| | | |
|---|---|---|
| *H02M 7/04* | (2006.01) | |
| *H02J 1/00* | (2006.01) | |
| *H02H 3/10* | (2006.01) | |
| *H02M 1/42* | (2007.01) | |
| *H02J 4/00* | (2006.01) | |

(52) U.S. Cl.
CPC .......... *H02M 1/4216* (2013.01); *Y02B 70/126* (2013.01); *Y10T 307/352* (2015.04)

(56) References Cited

U.S. PATENT DOCUMENTS

| | | |
|---|---|---|
| 5,526,213 A | 6/1996 | MacLauchlan et al. |
| 6,466,468 B1 | 10/2002 | York |
| 2003/0197428 A1 | 10/2003 | Hatton et al. |
| 2006/0081616 A1 | 4/2006 | Schuler |
| 2006/0187594 A1 | 8/2006 | Disalvo |
| 2007/0253135 A1 | 11/2007 | Bovitz |
| 2008/0100136 A1 | 5/2008 | Langlois et al. |
| 2008/0239771 A1 | 10/2008 | Wang et al. |
| 2009/0218407 A1* | 9/2009 | Rofougaran ....... G06K 19/0724 235/492 |
| 2010/0327771 A1 | 12/2010 | Schlenk et al. |
| 2011/0010017 A1 | 1/2011 | Jouper |
| 2011/0254371 A1 | 10/2011 | Galsim et al. |
| 2011/0273010 A1 | 11/2011 | Tardy |
| 2012/0013193 A1* | 1/2012 | Sato ......... H02J 9/062 307/80 |
| 2012/0232728 A1 | 9/2012 | Karimi et al. |
| 2012/0262950 A1* | 10/2012 | Nate ......... H02J 9/005 363/16 |
| 2012/0298166 A1* | 11/2012 | Chen ......... H01L 31/044 136/244 |
| 2013/0128396 A1 | 5/2013 | Danesh |
| 2014/0117753 A1* | 5/2014 | Pradier ......... H02J 1/14 307/9.1 |
| 2014/0167779 A1 | 6/2014 | Si |
| 2014/0217967 A1* | 8/2014 | Zeine ......... H02J 7/025 320/108 |
| 2014/0232196 A1 | 8/2014 | Cameron |
| 2015/0123464 A1 | 5/2015 | Hess |
| 2015/0145325 A1* | 5/2015 | Mir ......... H02M 1/4216 307/9.1 |
| 2015/0302983 A1* | 10/2015 | Park ......... H02J 50/12 320/108 |

OTHER PUBLICATIONS

OPUS, Aviation Electrical Supplies—Safety and Compliance Provisions for Aircraft Ground Support Power Supplies.
EP 15166820, Extended European Search Report, dated Aug. 10, 2015.
EP 15188939, Extended European Search Report, dated Feb. 18, 2016.

* cited by examiner

DIRECT CURRENT POWER DISTRIBUTION AND FAULT PROTECTION

CROSS REFERENCE TO RELATED APPLICATION

The present application is a Continuation-in-Part of U.S. patent application Ser. No. 14/514,617, entitled "High-Voltage Direct Current Power Distribution and Fault Protection" and filed Oct. 15, 2014. U.S. Ser. No. 14/514,617 is a Continuation-in-Part of U.S. patent application Ser. No. 14/273,139, entitled "Power Distribution System for Low-Frequency AC Outlets" and filed May 8, 2014. The disclosures of U.S. Ser. Nos. 14/514,617 and 14/273,139 are hereby incorporated by reference herein in their entireties.

FIELD OF THE DISCLOSURE

The subject matter of the present disclosure generally relates to power distribution systems, and more particularly relates to distribution of high-voltage direct current.

BACKGROUND OF THE DISCLOSURE

The distribution of power among several loads presents certain challenges. This can be particularly true in environments where there is a limited amount of available power, but where hardware complexity and duplication are disadvantageous.

For instance, in commercial aircraft, power having certain characteristics should be supplied simultaneously to numerous loads, from consumer power outlets for use in powering personal electronic devices such as laptops or cellular telephones to reading lights and seatback electronic displays. Previous aircraft power distribution systems typically involve the distribution of raw aircraft power from a head-end device such as a power management system or circuit breaker, through a side wall disconnect panel to a first seat group. Power is then distributed from the first seat group to additional seat groups through seat-to-seat cabling that carries the power required by seat mounted power conversion units, which in turn provide power to a passenger interface at household voltage and frequency. Power carried through such seat-to-seat distribution networks is often 115 volt alternating current (VAC), three-phase power of either fixed (400 Hz) or variable (360-800 Hz) frequency. Seat power converters are necessary to convert this power to 110 VAC 60 Hz or other voltages to power passengers' electronic devices.

Systems of this type require seat power converters that are suitable for use with an aircraft platform, and thus they preferably have certain capabilities and characteristics, such as power factor correction, a low electromagnetic interference (EMI) signature, low current harmonics and a low load demand variation. Thus, the seat power converters often contain complex circuitry, such as energy storage and filtering devices, to adequately meet these requirements. In addition to the disadvantages inherent in complex circuitry, undesirable heat is generated at the point of conversion by processing power locally at the passengers' seats.

Often, various power management functions are accomplished alongside power distribution. Certain load distribution and management systems (LDMSs) have been previously disclosed. U.S. Pat. No. 5,754,445, titled "Load Distribution and Management System," by Jouper et al. relates to such systems. U.S. Pat. No. 6,046,513, titled "Load Distribution and Management System," by Jouper et al., U.S. Pat. No. 8,295,065, titled "System control by use of phase rotation signaling" by Jouper, and U.S. Pat. App. No. 2012/0,139,341, titled "System control by use of phase rotation signaling," by Jouper, each relate to LDMSs. The disclosures of U.S. Pat. Nos. 5,754,445, 6,046,513, 8,295,065 and U.S. Pat. App. No. 2012/0,139,341 are hereby incorporated by reference herein in their entirety.

The subject matter of the present disclosure is directed to overcoming, or at least reducing the effects of, one or more of the problems set forth above.

BRIEF SUMMARY OF THE DISCLOSURE

Disclosed is a system and method for the distribution of power to several loads.

In an embodiment, a power source supplies AC input power to a high-voltage direct current unit (HVDCU) that is configured to convert the AC input power into DC power for distribution. The power source may originate from a generator driven by an aircraft engine, as with traditional aircraft, or from a fuel cell or other energy storage device as with an electrically-driven aircraft. This DC power is then distributed to various loads through control units (CUs) that further process the power as necessary to conform to load requirements. Distribution of power from the HVDCU is accomplished over a first and second distribution rail, one carrying a positive voltage and the other carrying an equal but negative voltage. A ground fault circuit interrupter (GFCI) is employed and monitors the differential between the voltage distribution rails to protect against faults. An arc fault circuit interrupter (AFCI) may also be employed.

Thus a safe and effective power distribution system using DC power is provided. Less power processing must be accomplished locally in proximity to the various loads, decreasing hardware requirements in complex systems. Weight reduction may be particularly advantageous to aircraft operators, as even small weight savings can lead to increases in aircraft performance, reduced initial capital and maintenance costs, and significant cost savings over the operational life span of the aircraft, particularly from reduced fuel consumption.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

In a certain embodiments, 56 VDC in total is distributed from a HVDCU to control units by passing +28 VDC across a positive distribution rail and −28 VDC across a negative distribution rail. In such an embodiment, it will be understood by those of ordinary skill in the art that the provided voltages are ideal and that minor fluctuations in the voltages can be consistent with those experienced by similar distribution systems without departing from the disclosed subject matter. For instance, in an embodiment the tolerance may be +/−7%, which allows the system to remain below a 60 VDC upper limit. In another embodiment, the tolerance may be +/−5% so as to meet power quality standards of 5-10%.

Figure 1:
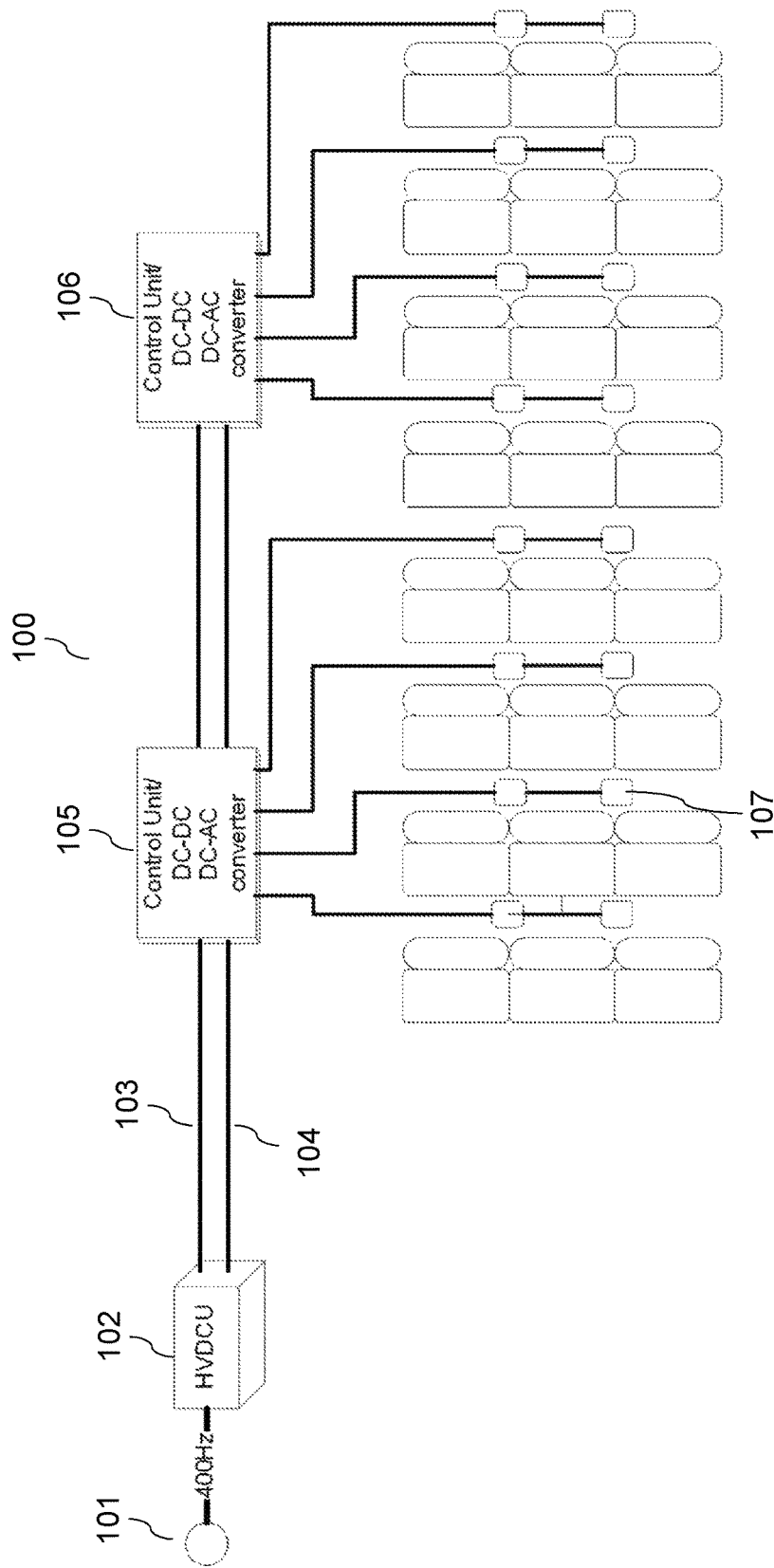
FIG. 1 is a schematic diagram of an embodiment contained within a commercial aircraft.

FIG. 1 is a schematic illustration of the 56 VDC embodiment. Aircraft power distribution and management system 100 has power source 101 that provides high-frequency AC input power to HVDCU 102. HVDCU 102 includes a PFC unit (not shown) and a DC-DC converter (not shown). The PFC unit converts the high-frequency alternating current input power into an intermediate DC power and the DC-DC converter processes the intermediate DC power into distribution DC power. In the embodiment, the distribution DC power is of a lower voltage than the intermediate DC power. The distribution power is 56 VDC, which is pass over negative distribution rail 103 and positive distribution rail 104. Negative distribution rail 103 carries −28 VDC and positive distribution rail 104 carries +28 VDC. The distribution power is transferred to control units (CUs) 105 and 106 that are electrically disposed between the positive and negative distribution rails. Each CU is configured to convert the distribution power into output power that is compatible with a load(s) 107. Depending on the power needs of the loads, CUs may include DC-DC and/or DC-AC converter hardware.

The 56 VDC embodiment may be advantageous in certain scenarios as the 28 VDC voltage carried on either distribution rail is less than that which would cause injury to users who are inadvertently electrocuted.

Various loads can be optionally supported, including without limitation such items as reading lights, electronic displays, AC consumer power outlets, USB power outlets, passenger address systems, wireless access points and personal electronic devices.

It should be understood by those of skill in the art to which the present disclosure pertains that the described HVDCUs and CUs may be employed in any suitable number or configuration. For instance, in a passenger aircraft zones may be established, each with a HVDCU supporting multiple CUs. High-frequency power as used in the present disclosure refers to currency with a frequency inclusive of between 360 and 800 Hz. The input power may be 115 VAC 400 Hz three-phase power, 115 VAC 360-380 Hz three-phase power, 230 VAC 400 Hz three-phase power or 230 VAC 360-380 Hz three-phase power or any other voltage as is available in the host vehicle.

Some embodiments may perform power management functions in addition to distribution functions. For instance, in a situation where additional power is not available, the HVDCU and CUs may be configured to disable unused outlet units so that additional loads are not added to the power system, while still allowing those loads that are already drawing power to continue doing so. Thus, disruption to the passengers of a vehicle employing such an embodiment would be reduced, while load management is still accomplished effectively.

Some HVDCUs of certain embodiments may, in addition to a status whether power is available, make use of additional inputs in determining whether to disable unused or all outlet units. Power management may thus be accomplished in response to the dynamic circumstances in which an embodiment may operate. In one instance, the system may take an input from other systems such as the cabin thermal management to limit the overall power by disabling unused outlets based on thermal characteristics. In a second instance, a HVDCU may disable all outlets in a decompression event on an aircraft, thereby conserving power for more critical aircraft systems.

Figure 2:
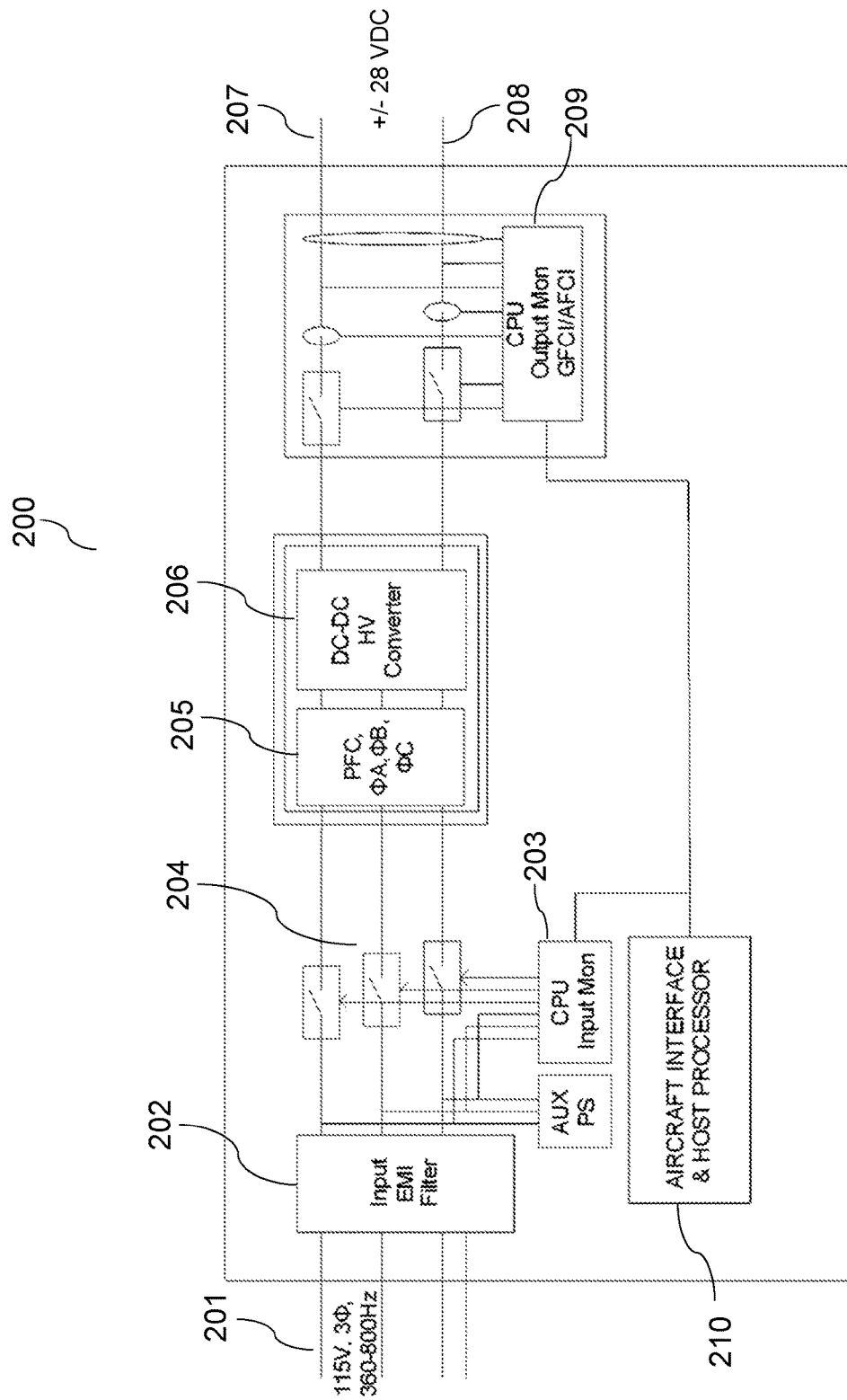
FIG. 2 is a schematic diagram of a centralized high-voltage direct current unit of an embodiment.

FIG. 2 is a schematic diagram of HVDCU 200 of an embodiment. High-voltage AC power is received along input power lines 201 and is fed to EMI filter 202, where electromagnetic filtering is conducted. Switching noise from internal circuits is suppressed and filtered to prevent it from entering back into input power lines 201. Input monitor central processing unit (CPU) 203 monitors the input power to determine whether it is within the nominal voltage and frequency range (typically 102-122 VAC and 360-800 Hz). When the input voltage is within an allowable range, relays 204 are closed to allow power to flow to power factor correction (PFC) unit 205. PFC unit 205 corrects for current harmonics and power factor to satisfy aircraft platform requirements. Intermediate power, typically in the form of 350 VDC, is then passed to DC-DC converter 206. This intermediate power is used to store energy for short periods of power loss, typically in the range of 1-200 mSec. DC-DC converter 206 processes the intermediate power and supplies it onto positive DC distribution rail 207 and negative DC distribution rail 208, each of which carries approximately 28 VDC. Output monitor CPU 209 monitors the current consumption and output voltage along each distribution rail and acts to detect short circuit conditions, leakage current and arc fault events.

Interface and host processor 210 interprets signals from the other vehicle systems. In an aircraft, information regarding decompression, weight-on-wheels, power availability, cabin environmental management and system On/Off status allow HVDCU 200 to control the system as necessary during various flight phases.

Figure 3:
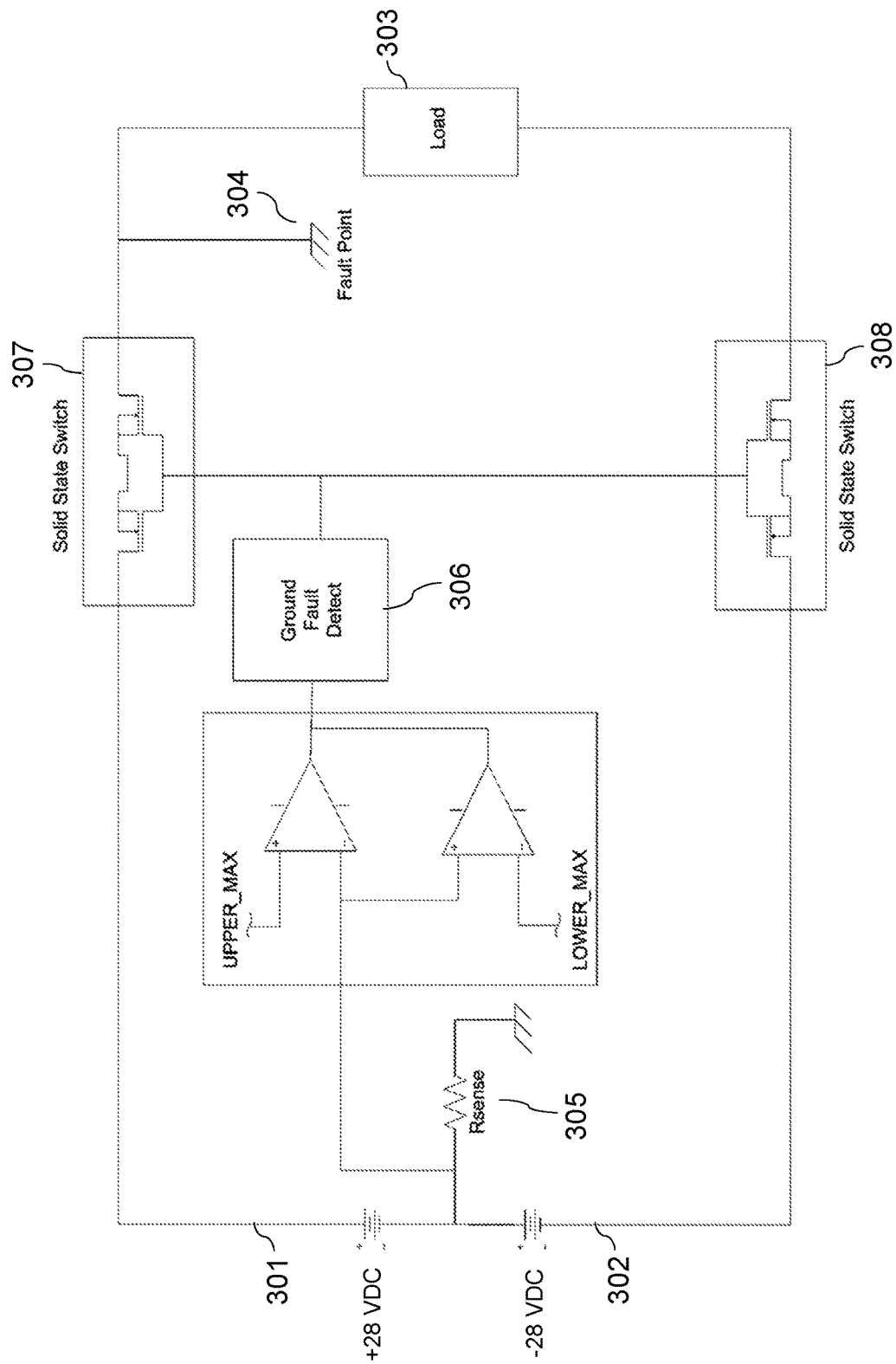
FIG. 3 is a schematic diagram of a ground fault circuit interrupter operating in an embodiment.

In certain legacy systems it was difficult to discern leakage current from load current because the return is referenced to the aircraft structure. The disclosed dual voltage rail system presents advantages in this respect, particularly the ability to monitor leakage current from either distribution rail to the chassis in order to mitigate even minor faults to the structure. FIG. 3 illustrates the sensing of leakage current from one of the rails.

FIG. 3 is a schematic illustration of a ground fault circuit interrupter (GFCI) that may be employed in certain embodiments, particularly in an aircraft. Distribution rails 301 and 302 deliver power to load 303 that typically consumes power equally from each rail. However, a ground fault occurs at fault point 304. If the fault is human contact, that individual may be subject to injury. Resistor 305 has a relatively high impedance between the aircraft frame and a point between the distribution rails. While the load is drawing current from both voltage rails, the voltage developed across resistor 305 is ideally zero. If either distribution rail has a leakage path to the frame, such as is the case with fault point 304, then a voltage equivalent to the current through the fault path will be developed across resistor 305. The set-point can be chosen arbitrarily, for example such as at the positive rail at +200 VDC and the negative rail at −70 VDC. If either an upper or lower threshold is exceeded, ground fault detect unit 306 can cease power flow over the distribution rails, in this embodiment by controlling first solid state switch 307 and second solid state switch 308.

In certain embodiments, in addition to the GFCI, an arc fault circuit interrupter (AFCI) will trigger on the occurrence of intermittent current events. An output control CPU of a HVDCU monitors each voltage distribution rail's output current for spurious current in excess of that normally seen by the load types being serviced. These spurious currents are indicative of either series or parallel arc faults, which can be too short in their duration to trip the output current limit function. Thus, together the GFCI and AFCI can mitigate certain safety concerns present with the use of high-voltage DC systems.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A power distribution system, comprising:
   a high-voltage direct current unit (HVDCU) configured to receive high-frequency alternating current (AC) input power from a power source and including a power factor correction (PFC) unit and a DC-DC high-voltage converter;
   wherein the PFC unit is configured to convert the high-frequency alternating current input power into an intermediate DC power and the DC-DC high voltage converter is configured to process the intermediate DC power into distribution DC power, wherein the distribution DC power is of a lower voltage than the intermediate DC power;
   a negative voltage distribution rail configured to provide −28 VDC of the distribution DC power and a positive voltage distribution rail configured to provide +28 VDC of the distribution power to at least one control unit (CU);
   each the CU being configured to convert the distribution DC power into output power compatible with at least one load and supply the output power to the loads associated with it;
   a ground fault circuit interrupter (GFCI) configured to cease power flow if fault path voltage exceeds a setpoint threshold; and
   wherein the loads include at least one selected from the group consisting of electronic display, AC consumer power outlet, USB power outlet, passenger address system, wireless access point and personal electronic device.

2. The system of claim 1 wherein each CU is electrically disposed between the negative distribution rail and the positive distribution rail.

3. The system of claim 2 wherein the power source originates from a generator driven by an aircraft engine, fuel cell or other energy storage device.

4. The system of claim 1 wherein the GFCI includes a sensing element electrically disposed between the negative voltage distribution rail and the positive voltage distribution rail and a structure and that is configured to detect a voltage across it indicative that a ground fault condition exists.

5. The system of claim 4 wherein the GFCI is configured to, upon detection of a fault condition, cause a first solid state switch to halt power flow in the positive distribution rail and cause a second solid state switch to halt power flow in the negative distribution rail.

6. A power distribution system, comprising:
   a high-voltage direct current unit (HVDCU) configured to receive high-frequency alternating current (AC) input power from a power source and including a power factor correction (PFC) unit and a DC-DC high-voltage converter;
   wherein the PFC unit is configured to convert the high-frequency alternating current input power into an intermediate DC power and the DC-DC high voltage converter is configured to process the intermediate DC power into distribution DC power, wherein the distribution DC power is of a lower voltage than the intermediate DC power;
   a negative voltage distribution rail configured to provide −28 VDC of the distribution DC power and a positive voltage distribution rail configured to provide +28 VDC of the distribution power to at least one control unit (CU);
   each the CU being configured to convert the distribution DC power into output power compatible with at least one load and supply the output power to the loads associated with it;
   an arc fault circuit interrupter (AFCI) configured to detect an arc fault condition between the positive distribution rail and the negative distribution rail
   wherein the loads include at least one selected from the group consisting of electronic display, AC consumer power outlet, USB power outlet, passenger address system, wireless access point and personal electronic device.

7. A power distribution system, comprising:
   a high-voltage direct current unit (HVDCU) configured to receive high-frequency alternating current (AC) input power from a power source and including a power factor correction (PFC) unit and a DC-DC high-voltage converter;
   wherein the PFC unit is configured to convert the high-frequency alternating current input power into an intermediate DC power and the DC-DC high voltage converter is configured to process the intermediate DC power into distribution DC power, wherein the distribution DC power is of a lower voltage than the intermediate DC power;
   a negative voltage distribution rail configured to provide −28 VDC of the distribution DC power and a positive voltage distribution rail configured to provide +28 VDC of the distribution power to at least one control unit (CU) with each CU electrically disposed between the negative distribution rail and the positive distribution rail;
   each the CU being configured to convert the distribution DC power into output power compatible with at least one load and supply the output power to the loads associated with it;
   wherein the loads include at least one selected from the group consisting of electronic display, AC consumer power outlet, USB power outlet, passenger address system, wireless access point and personal electronic device; and
   wherein the HVDCU and the CUs are configured to disable at least one unused load in the event that additional power is not available.

8. The system of claim 7 wherein the HVDCU is configured to filter electromagnetic interference (EMI) in the input power.

9. The system of claim 7 wherein the at least one CU includes at least a first CU and a second CU, wherein the first CU is electrically connected to the HVDCU and the second CU is electrically connected to the first CU.

10. A method of distributing power, comprising:
    providing AC input power from a generator driven by a device selected from the group consisting of an aircraft engine, a fuel cell and another energy storage device to a HVDCU including a PFC unit and a DC-DC high-voltage converter;

converting at the PFC unit the high-frequency AC input power into an intermediate DC power;

converting at the DC-DC high-voltage intermediate DC power into distribution DC power;

wherein the distribution DC power is of a lower voltage than the intermediate DC power;

distributing −28 VDC of the distribution DC power over a negative voltage distribution rail and distributing +28 VDC of the distribution DC power over a positive voltage distribution rail to at least one CU;

converting the distribution DC power to output power that is compatible with at least one load;

distributing the output power to the loads from the CU;

wherein the loads include at least one selected from the group consisting of electronic display, AC consumer power outlet, USB power outlet, passenger address system, wireless access point and personal electronic device; and wherein the HVDCU and CUs are configured to cause to be disabled any unused loads that are consumer power outlets when no additional power is available.

11. The method of claim 10 wherein:

The input power is selected from the group consisting of 115 Volt Alternating Current (VAC) 400 Hz three-phase power, 115 VAC 360-380 Hz three-phase power, 230 VAC 400 Hz three-phase power and 230 VAC 360-380 Hz three-phase power.

12. The method of claim 10 wherein the power source originates from a generator driven by an aircraft engine, fuel cell or other energy storage device.

13. A method of distributing power, comprising:

providing AC input power from a power source to a HVDCU including a PFC unit and a DC-DC high-voltage converter;

converting at the PFC unit the high-frequency AC input power into an intermediate DC power;

converting at the DC-DC high-voltage intermediate DC power into distribution DC power;

wherein the distribution DC power is of a lower voltage than the intermediate DC power;

distributing −28 VDC of the distribution DC power over a negative voltage distribution rail and distributing +28 VDC of the distribution DC power over a positive voltage distribution rail to at least one CU;

converting the distribution DC power to output power that is compatible with at least one load:

distributing the output power to the loads from the CU;

halting power flow to the loads when a ground fault condition is detected by a GFCI; and wherein the loads include at least one selected from the group consisting of electronic display, AC consumer power outlet, USB power outlet, passenger address system, wireless access point and personal electronic device.

14. The method of claim 13, wherein the step of halting power flow to the loads includes detecting a voltage across a resistor that is electrically disposed at a voltage point between the negative voltage distribution rail and the positive voltage distribution rail and a structure that indicates that a ground fault condition exists.

15. A method of distributing power, comprising:

providing AC input power from a power source to a HVDCU including a PFC unit and a DC-DC high-voltage converter;

converting at the PFC unit the high-frequency AC input power into an intermediate DC power;

converting at the DC-DC high-voltage intermediate DC power into distribution DC power;

wherein the distribution DC power is of a lower voltage than the intermediate DC power;

distributing −28 VDC of the distribution DC power over a negative voltage distribution rail and distributing +28 VDC of the distribution DC power over a positive voltage distribution rail to at least one CU;

converting the distribution DC power to output power that is compatible with at least one load;

distributing the output power to the loads from the CU;

halting power to the loads when an arc fault is detected by an AFCI; and wherein the loads include at least one selected from the group consisting of electronic display, AC consumer power outlet, USB power outlet, passenger address system, wireless access point and personal electronic device.

16. A method of distributing power, comprising:

providing AC input power from a power source to a HVDCU including a PFC unit and a DC-DC high-voltage converter;

converting at the PFC unit the high-frequency AC input power into an intermediate DC power;

converting at the DC-DC high-voltage intermediate DC power into distribution DC power;

wherein the distribution DC power is of a lower voltage than the intermediate DC power;

distributing −28 VDC of the distribution DC power over a negative voltage distribution rail and distributing +28 VDC of the distribution DC power over a positive voltage distribution rail to at least one CU;

converting the distribution DC power to output power that is compatible with at least one load:

distributing the output power to the loads from the CU;

wherein the loads include at least one selected from the group consisting of electronic display, AC consumer power outlet, USB power outlet, passenger address system, wireless access point and personal electronic device; and wherein the at least one CU includes at least a first CU and a second CU, wherein the first CU is electrically connected to the HVDCU and the second CU is electrically connected to the first CU.

17. A method of distributing power, comprising:

providing AC input power from a power source to a HVDCU including a PFC unit and a DC-DC high-voltage converter;

converting at the PFC unit the high-frequency AC input power into an intermediate DC power;

converting at the DC-DC high-voltage intermediate DC power into distribution DC power;

wherein the distribution DC power is of a lower voltage than the intermediate DC power;

distributing −28 VDC of the distribution DC power over a negative voltage distribution rail and distributing +28 VDC of the distribution DC power over a positive voltage distribution rail to at least one CU;

converting the distribution DC power to output power that is compatible with at least one load:

distributing the output power to the loads from the CU;

wherein the loads include at least one selected from the group consisting of electronic display, AC consumer power outlet, USB power outlet, passenger address system, wireless access point and personal electronic device; and wherein the PFC unit corrects the power factor of the input power during the step of converting the high-frequency AC input power into intermediate DC power.

* * * * *